(12) United States Patent
Depue

(10) Patent No.: US 6,325,840 B1
(45) Date of Patent: Dec. 4, 2001

(54) PROCESS FOR TREATING BY-PRODUCTS FROM ZINC SMELTING AND THE LIKE

(76) Inventor: John S. Depue, 119 Maple Lake, Bridgeport, WV (US) 26330

(*) Notice: Subject to any disclaimer, the term of this patent is extended or adjusted under 35 U.S.C. 154(b) by 0 days.

(21) Appl. No.: 09/429,724

(22) Filed: Oct. 29, 1999

Related U.S. Application Data

(60) Provisional application No. 60/106,107, filed on Oct. 29, 1998.

(51) Int. Cl.[7] .................................................. C22B 19/20

(52) U.S. Cl. .................................. 75/712; 75/743; 75/744

(58) Field of Search ............................... 75/712, 743, 744

(56) References Cited

U.S. PATENT DOCUMENTS

| | | | |
|---|---|---|---|
| 4,428,830 | 1/1984 | Hepfner et al. ...................... 209/211 |
| 4,545,963 | * 10/1985 | Weir et al. .............................. 423/26 |
| 4,708,789 | * 11/1987 | Cox ...................................... 209/457 |
| 6,103,204 | * 8/2000 | Lizama et al. ........................ 423/109 |

* cited by examiner

Primary Examiner—Roy King
Assistant Examiner—Tina McGuthry-Banks
(74) Attorney, Agent, or Firm—Webb Ziesenheim Logsdon Orkin & Hanson, P.C.

(57) ABSTRACT

A process for treating zinc mine tailings wherein a series of wave tables and cone separators are utilized to remove various components from the zinc mine tailings, such as carbon, zinc, lead, copper and precious metals. The recovered carbon is then transferred to a cogeneration plant where it is utilized as fuel.

6 Claims, 2 Drawing Sheets

PROCESS FOR TREATING BY-PRODUCTS FROM ZINC SMELTING AND THE LIKE

CROSS REFERENCE TO RELATED APPLICATION

This utility patent application claims priority from U.S. Provisional Patent Application No. 60/106,107, filed Oct. 29, 1998.

BACKGROUND OF THE INVENTION

The present invention relates generally to the processing of zinc mine tailings to recover various components, including metals. More specifically, the present invention relates to the processing of zinc mine tailings to separate and remove the zinc powder, copper and various other semi-precious and precious metals without the use of any chemicals, and the integrated use of the separated carbon in an integrated cogeneration plant.

Zinc mine tailings are a product of the smelting of zinc, and often contain mixtures of coal, zinc powder, copper, lead and certain precious metals such as gold or silver. It has been estimated that zinc mine tailings contain up to 18% by volume of zinc and up to 28% by volume of copper. Nevertheless, because of the difficulty, expense and environmental hazards relating to the separation of these desired metals, no such separation is generally attempted. It is thus commonplace for zinc mine tailings to be simply piled and used as landfill. Unfortunately, this method of zinc mine tailing disposal often results in the leaching of copper, lead and other metals into the ground water.

Various methods of attempting to obtain valuable metals from zinc mine tailings are known in the prior art. However, the prior art methods involve the use of potentially dangerous and environmentally hazardous chemicals. Non-chemical methods of precious metal recovery using aqueous separation means are shown in U.S. Pat. No. 4,428,830. However, these aqueous systems are generally of the hand-held variety and do not provide an industrial application as for an integrated cogeneration plant.

SUMMARY OF THE INVENTION

The present invention provides a process for treating zinc smelting by-products which permits the environmentally safe and cost effective separation of various metals therefrom. The process utilizes one or both of a series of wave tables or a cone separator, both of which use a recirculating water supply.

The zinc mine tailings which result from a smelting process are first mixed with water or air to create a slurry. This slurry is then moved over a series of wave tables which are set at varying specific gravities. The slurry is moved over a combination of weirs which are combined with the mechanical movement of the wave table, thus causing the water or air to move in such a manner that the fine metals rise.

Once the metals rise to the top of the water in the various wave tables, the separated metals are routed through chutes into individual containers. This system is based upon the specific gravities of the materials to be separated. The equipment is sized and adjusted to correspond to the specific gravities of each.

A cone separator may be used in place of, or in conjunction with the wave table apparatus. The cone separator is a cone-shaped device in which the zinc mine tailing slurry is placed. This cone-shaped device has the wide end at its top and its narrow end or point at the base. The cone separator moves the slurry around its inside periphery in an upward direction, to separation ports which are located at the upper portion of the cone separator. The cone separator also utilizes specific gravity and particle size to separate the various metal components of the slurry through chutes into individual containers. Additionally, the cone-shaped device employs recyclable water or air to suspend and carry the slurry through the process.

The slurry is thus subjected to one or both of the wave table or cone-shaped separator process to provide for the initial recovery of metals, including copper, zinc, lead, gold and silver. The gold and silver are retrieved in a concentrate form that requires further processing for extraction.

The material remaining from the slurry subsequent to the separation process is primarily the carbon portion of the zinc mine tailings. This remaining portion of the zinc mine tailings is dewatered then transported to the integrated cogeneration plant to be used as fuel for the production of electrical energy and to process steam.

Caloric values of various zinc mine tailings are usually in the broad range between 3,000 BTU/LB and 12,781 BTU/LB (MAF). To utilize this wide range of caloric value fuel, a boiler of known successful operation for the burning of lower grade coal products is used. The boiler system is built around a Pines Circulating Fluidized Bed System which is a hybrid between bubbling and circulating bed technology. This system is designed to optimize the dense-phase reaction of the combustion and sulfur absorption with low bed velocities in the bottom portion of the fluid bed, and to promote the lean-phase reactions of NOx reduction and co/char burnout in the fully entrained upper portion of the combustor.

Solids larger than fifteen (15) microns are separated in cyclones and are returned to the turbulent bed. Solids which are not separated by the cyclones are collected in one or both of downstream fabric filters and electrostatic precipitators. This system has a combustion at temperature levels whereby most of any remaining heavy metals will be encapsulated by the resultant ash. The energy generated by this process is used in part to produce steam, which drives the turbines which are used to heat or to generate electricity.

Subsequent to the burning of carbon in the system, the resultant ash may be again processed through the separation system to recover any remaining metals. Otherwise, the resultant ash can be redeposited on the cleaned-up smelter site to neutralize acid leaching. This ash could also be used by the cement industry for road beds.

The burning of the zinc mine tailings may also be performed without first performing the metal recovery/separation process. To do so, the zinc mine tailings are first crushed and then steam dried to raise the BTU value. These zinc mine tailings can then be placed in the cogeneration plant. The remaining material subsequent to burning can then be placed in the metal recovery/separation system. It is also possible to add lime to the zinc mine tailings to raise the alkaline content and encapsulate any heavy metals existing therein.

The present invention thus provides an environmentally safe method of disposing zinc mine tailings and recovering any existing valuable metals therefrom. This system employs no chemicals and requires no secondary fuel.

DETAILED DESCRIPTION OF THE INVENTION

Figure 2:
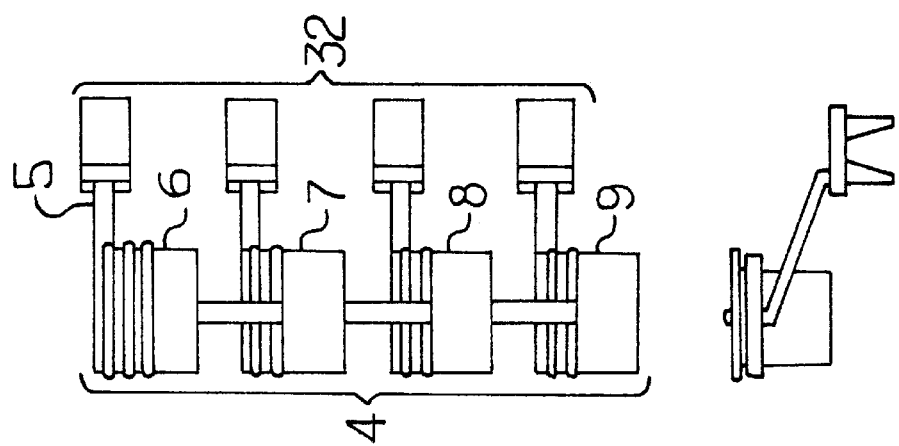
FIG. 2 illustrates the general structure of the flow-metal recovery/separation system.
Figure 1:
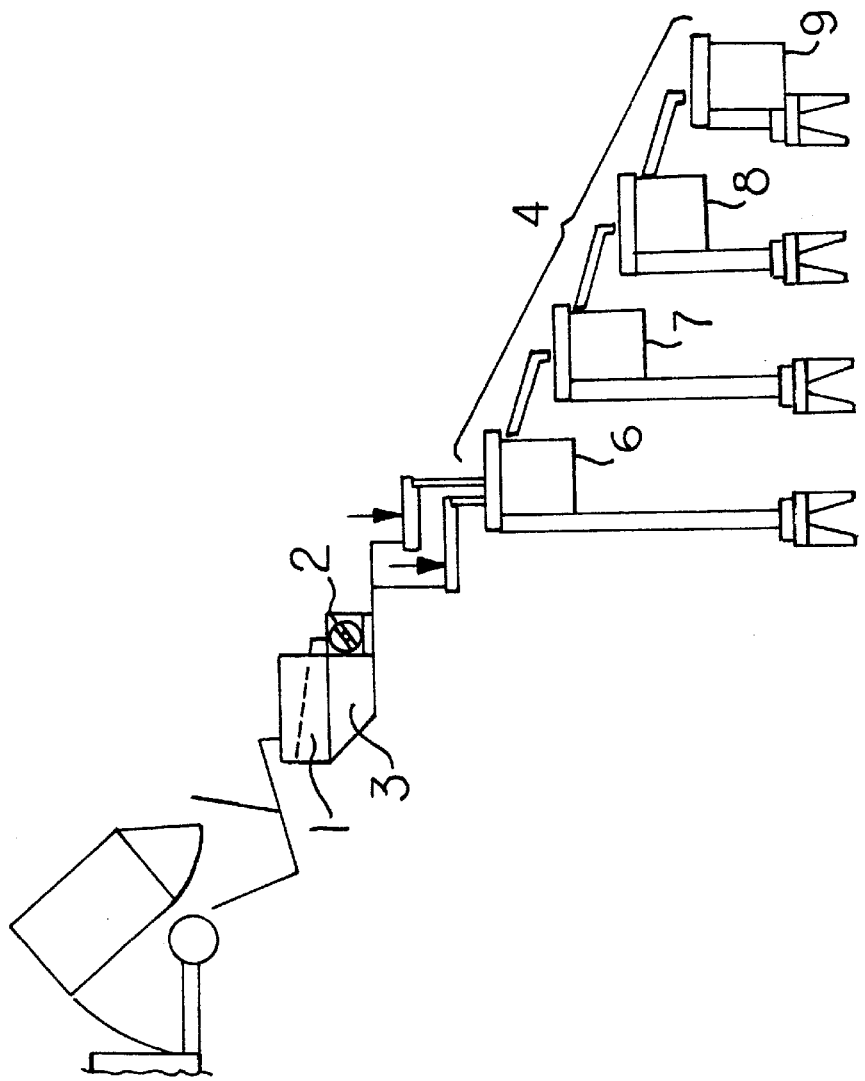
FIG. 1 illustrates the general structure of the flow-metal recovery/separation system.

Referring to the drawings, FIGS. 1 and 2 depict the flow-metal recovery or separation system of the present invention. The zinc mine tailings which result from a melting process are passed through a screen 1 in order to separate the larger portions. The larger zinc mine tailings which do pass through screen 1 are then passed through a reduction mill 2 to reduce their size. The small portions of the zinc mine tailings pass through the screen 1 into the accept bin 3. The resulting smaller zinc mine tailings are then mixed with water or air to create a slurry. This slurry is then moved over a series of wave tables 4 which are set at varying specific gravities. The slurry is moved over a combination of weirs which are combined with the mechanical movement of the wave tables 4, thus causing the water or air to move in such a manner that the fine metals rise.

Once the metals rise to the top of the water or air in the wave tables 4, the separated metals are routed through chutes 5 into individual containers. This system is based upon the specific gravities of the materials to be separated. The equipment is sized and adjusted to correspond to the specific gravities of each. Specifically, the first wave table 6 removes approximately ¾ of the zinc mine tailing composition which is carbon and is routed directly to the cogeneration plant. Approximately 20% of the zinc mine tailings will be removed by the second wave table 7 which directs the zinc concentrates to a smelter. A third wave table 8 removes the approximately 5% of copper concentrates and directs them to a smelter. A fourth wave table 9 removes the remaining small percentage of precious metal concentrates and directs them for further processing. A secondary wave table 7 may be attached to each primary wave table 4 for further refinement of the recovered components.

A cone separator may be used in place of, or in conjunction with, the wave table apparatus. The cone separator is a cone-shaped device in which the zinc mine tailing slurry is placed. This cone shaped device has the wide end at its top and its narrow end or point at the base. The cone separator moves the slurry around its inside periphery in an upward direction, to separation ports which are located at the upper portion of the cone separator. The cone separator also utilizes specific gravity and particle size to separate the various metal components of the slurry through chutes into individual containers. Both the wave tables and the cone-shaped device employ recyclable water or air to suspend and carry the slurry through the processes.

The slurry can therefore be subjected to one or both of the wave table or cone separator processes to provide for the initial recovery of metals, including copper, zinc, lead, gold and silver. As noted above, the gold and silver are retrieved in a concentrate form that requires further processing for extraction.

The material remaining from the slurry subsequent to the separation/metal recovery process is primarily the carbon portion of the zinc mine tailings, which generally forms about 75% of the zinc mine tailing composition. This remaining portion of the zinc mine tailings is removed by the first wave table 6, dewatered, then transported to the integrated cogeneration plant to be used as fuel for the production of electrical energy and to process steam.

Figure 3:
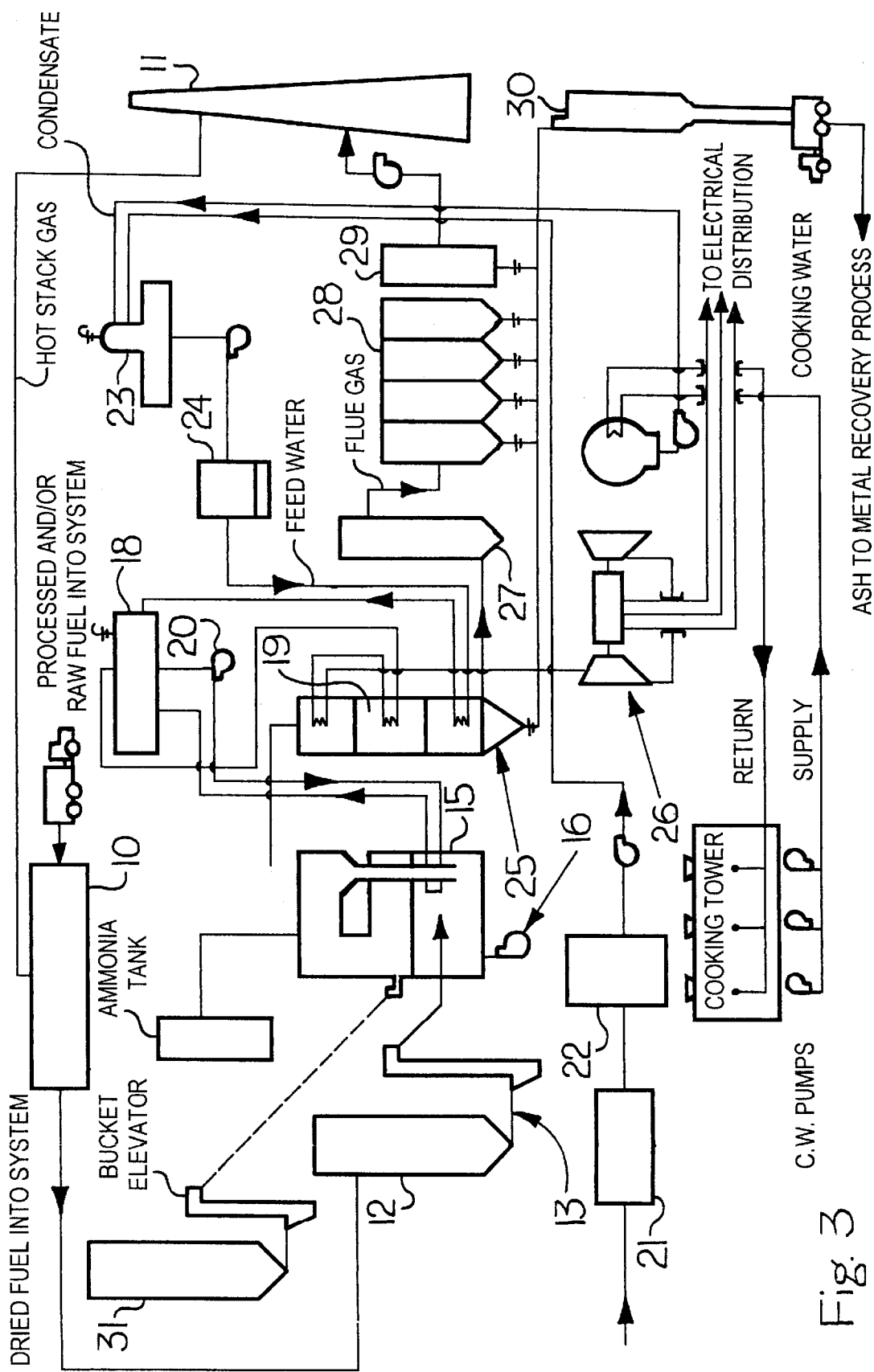
FIG. 3 illustrates the general structure of the cogeneration system.

Referring to FIG. 3, the separated carbon portion of the zinc mine tailings or the "processed fuel" is then transported to the drying belt 10 of the cogeneration plant. The processed fuel is dried by hot stack gas which emanates from the stack 11 and is piped to the drying belt 10. The drying belt 10 consists of a conveyor which carries the processed fuel through the hot stack gas. A rotary drying device using the hot stack gas may also be utilized.

The resultant dried processed fuel is then fed into a boiler system for the burning of the dried processed fuel. The boiler system is built around a Pines Circulated Fluidized Bed System. This system consists of a fuel silo 12 into which the dried processed fuel is fed. The dried processed fuel is fed by means of a metering screw 13 from the fuel silo 12 through the fuel lines 14 into the fluidized bed 15 by means of the forced draft fan 16. The fluidized bed 15 is attached to the combustor 17 which is in recirculating connection with the steam drum 18, superheater 19 and boiler circulating water pump 20. Water is supplied into the superheater 19 from an initial outside water supply 21 into a water storage tank 22 into the deaerator 23 then into a heater 24 and finally into the superheater 19 within the economizer 25. The steam produced by the superheater 19 is utilized to power the turbine generator 26 to generate electricity.

Additionally, a portion of the steam generated from the superheater 19 is directed to the air heater 27. Flue gas from the air heater 27 is then directed into the electrostatic precipitators 28 to the high temperature bag house 29 and finally to the stack 11.

The waste ash resulting from the burnt carbon is collected into the ash silo 30. The waste ash, containing solids larger than fifteen microns, are separated in cyclones and are returned to the fluidized bed 15. Solids which are not separated by the cyclones are collected in the electrostatic precipitators 28. This system has a combustion at temperature levels whereby most of any remaining heavy metals will be encapsulated by the resultant ash.

Subsequent to the burning of carbon in the system, the resultant ash may be again processed through the separation system to recover any remaining metals. Otherwise, the resultant ash can be redeposited on the cleaned-up smelter site to neutralize acid leaching. This ash could also be used by the cement industry for road beds.

The burning of the zinc mine tailings may also be performed without first performing the metal recovery/separation process. To do so, the zinc mine tailings are first crushed and then steam dried to raise the BTU value. These zinc mine tailings can then be placed in the cogeneration plant. The remaining material subsequent to burning can then be placed in the metal recovery/separation system.

It is also possible to add lime from the lime silo 31 to the zinc mine tailings to raise the alkaline content and encapsulate any heavy metals existing therein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative and not limiting as to the scope of the invention.

What is claimed is:

1. A method for processing zinc mine tailings, which comprises:
   a) mixing zinc mine tailings with water or air to create a slurry; and
   b) passing the slurry through a separator to remove one or more of a carbon and a metal component from the slurry.

2. The method of claim 1, wherein the separator consists of one or more wave tables.

3. The method of claim 1, wherein the separator consists of a cone separator.

4. The method of claim 2, wherein the one or more wave tables are in a series and are set at separate various specific gravities to remove one or more of carbon and the metal component from the slurry.

5. The method of claim 4, wherein the carbon removed from the slurry is transported to a cogeneration plant wherein it is used as fuel.

6. The method of claim 4, wherein multiple wave tables are utilized for the removal of carbon and one or more of copper, zinc, lead, gold and silver.

* * * * *